United States Patent
Terry

(10) Patent No.: US 9,998,943 B2
(45) Date of Patent: *Jun. 12, 2018

(54) METHOD AND APPARATUS FOR ENHANCED UPLINK MULTIPLEXING

(71) Applicant: Intel Corporation, Santa Clara, CA (US)

(72) Inventor: Stephen E. Terry, Northport, NY (US)

(73) Assignee: INTEL CORPORATION, Santa Clara, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/154,784

(22) Filed: May 13, 2016

(65) Prior Publication Data

US 2016/0262042 A1 Sep. 8, 2016

Related U.S. Application Data

(63) Continuation of application No. 14/542,504, filed on Nov. 14, 2014, now Pat. No. 9,369,911, which is a continuation of application No. 14/032,114, filed on Sep. 19, 2013, now Pat. No. 8,923,173, which is a continuation of application No. 13/021,884, filed on
(Continued)

(51) Int. Cl.
| | |
|---|---|
| *H04B 7/00* | (2006.01) |
| *H04W 28/02* | (2009.01) |
| *H04W 28/24* | (2009.01) |
| *H04W 74/08* | (2009.01) |

(52) U.S. Cl.
CPC ... *H04W 28/0221* (2013.01); *H04W 28/0268* (2013.01); *H04W 28/24* (2013.01); *H04W 74/0875* (2013.01)

(58) Field of Classification Search
CPC ... H04W 76/04; H04W 76/046; H04W 80/02; H04W 80/08
USPC ....... 370/310, 328–330, 340, 341, 431, 462, 370/464, 465
See application file for complete search history.

(56) References Cited

U.S. PATENT DOCUMENTS

| | | | |
|---|---|---|---|
| 6,363,058 B1 | 3/2002 | Roobol et al. | |
| 6,907,010 B2 * | 6/2005 | Zhang | H04W 52/262 370/252 |

(Continued)

FOREIGN PATENT DOCUMENTS

| | | |
|---|---|---|
| CA | 2574104 | 5/2013 |
| CN | 1477886 | 2/2004 |

(Continued)

OTHER PUBLICATIONS

Examiner's Report in Canadian Application No. 2,855,844, dated Jan. 20, 2017, 3 pages.

(Continued)

*Primary Examiner* — Dmitry H Levitan
(74) *Attorney, Agent, or Firm* — Womble Bond Dickinson (US) LLP

(57) ABSTRACT

A method and apparatus for multiplexing are disclosed. Data is received over a plurality of logical channels. Data from the plurality of logical channels is multiplexed into a medium access control (MAC) protocol data unit (PDU) based on a priority associated with each of the plurality of the logical channels. The MAC PDU is transmitted over an uplink transport channel.

20 Claims, 3 Drawing Sheets

Related U.S. Application Data

Feb. 7, 2011, now Pat. No. 8,619,645, which is a continuation of application No. 11/113,763, filed on Apr. 25, 2005, now Pat. No. 7,885,245.

(60) Provisional application No. 60/588,960, filed on Jul. 19, 2004.

(56) References Cited

U.S. PATENT DOCUMENTS

| | | | |
|---|---|---|---|
| 7,058,032 | B2 | 6/2006 | Iacono et al. |
| 7,295,529 | B2 | 11/2007 | Hwang et al. |
| 7,415,046 | B2 | 8/2008 | Beckmann et al. |
| 7,515,616 | B2 | 4/2009 | Yi et al. |
| 7,522,526 | B2 | 4/2009 | Yi et al. |
| 7,593,407 | B2 | 9/2009 | Chun et al. |
| 7,885,245 | B2 | 2/2011 | Terry |
| 8,619,645 | B2 | 12/2013 | Terry |
| 8,923,173 | B2 | 12/2014 | Terry |
| 2003/0007517 | A1 | 1/2003 | Beckmann et al. |
| 2003/0036403 | A1 | 2/2003 | Shiu et al. |
| 2003/0053344 | A1 | 3/2003 | Herrmann |
| 2003/0112786 | A1 | 6/2003 | Terry et al. |
| 2003/0147371 | A1 | 8/2003 | Choi et al. |
| 2004/0042460 | A1 | 3/2004 | Gruhl et al. |
| 2004/0156330 | A1 | 8/2004 | Yi et al. |
| 2004/0228313 | A1 | 11/2004 | Cheng et al. |
| 2004/0228315 | A1 | 11/2004 | Malkamaki |
| 2005/0053035 | A1 | 3/2005 | Kwak |
| 2005/0073985 | A1 | 4/2005 | Heo |
| 2005/0180371 | A1 | 8/2005 | Malkamaki |
| 2006/0013268 | A1 | 1/2006 | Terry |
| 2007/0079207 | A1 | 4/2007 | Seidel et al. |
| 2008/0220802 | A1 | 9/2008 | Yamanaka et al. |
| 2014/0022905 | A1 | 1/2014 | Terry |

FOREIGN PATENT DOCUMENTS

| | | |
|---|---|---|
| EP | 0993148 | 4/2000 |
| TW | 200404435 | 3/2004 |
| TW | 200409553 | 6/2004 |
| TW | 200412807 | 7/2004 |
| WO | WO-2004059869 | 7/2004 |
| WO | WO-2005048491 | 5/2005 |
| WO | WO-2005048492 | 5/2005 |

OTHER PUBLICATIONS

Office Action in European Application No. 15180482.0 dated Mar. 3, 2017, 4 pgs.
Office Action and Examiners Search Report for Canadian Application No. 2855844 dated Mar. 24, 2016, 3 pages.
Notice of Allowance in Norwegian Application No. 20151760 dated Sep. 12, 2016, 2 pages.
Office Action and Search Report (+ English Translation) in Taiwanese Application No. 104125600 dated Oct. 26, 2016, 6 pages.
Notice to Grant in European Application No. 10179333.9 dated Nov. 21, 2016, 5 pages.
3GPP, $3^{rd}$ Generation Partnership Project; Technical Specification Group Radio Access Network; Radio Resource Control (RRC) Protocol Specification (Release 1999). 3GPP TS 25-331 V: 3.19.0, (Jun. 2004).
3GPP, "$3^{rd}$ Generation Partnership Project; Technical Specification Group Radio Access Network; Radio Resource Control (RRC) Protocol Specification (Release 1999)," 3GPP TS 25.331 \13.21.0, (Dec. 2004).
3GPP, "$3^{rd}$ Generation Partnership Project Technical Specification Group Radio Access Network: Radio Resource Control (RRC) Protocol Specification (Release 4)." 3GPP TS 25.331 V4.14.0. (Jun. 2004).
3GPP, "$3^{rd}$ Generation Partnership Project; Technical Specification Group Radio Access Network; Radio Resource Control (RRG) Protocol Specification (Release 4)," 3GPP TS 25.331 \14.17.0. (Mar. 2005).
3GPP, "$3^{rd}$ Generation Partnership Project Technical Specification Group Radio Access Network: Radio Resource Control (RRC) Protocol Specification (Release 5)." 3GPP TS 25.331 V5.9.0, (Jul. 2004).
3GPP, "$3^{rd}$ Generation Partnership Project; Technical Specification Group Radio Access Network; Radio Resource Control (RRC) Protocol Specification (Release 5)," 3GPP TS 25.331 V5.12.1, (Mar. 2005).
3GPP, "$3^{rd}$ Generation Partnership Project; Technical Specification Group Radio Access Network; Radio Resource Control (RRC) Protocol Specification (Release 6)," 3GPP TS 25.331 V6.5.0. (Mar. 2005).
3GPP, $3^{rd}$ Generation Partnership Project: Technical Specification Group Radio Access Network; FDD Enhanced Uplink; Overall Description; Stage 2 (Release 6), 3GPP TS 25.309 V0.2.0, (Jun. 2004).
3GPP, "$3^{rd}$ Generation Partnership Project; Technical Specification Group Radio Access Network; FDD Enhanced Uplink; Overall Description; Stage 2 (Release 6)." 3GPP TS 25.309 V6.2 0, (Mar. 2005).
3GPP, "$3^{rd}$ Generation Partnership Project; Technical Specification Group Radio Access Network: Medium Access Control (MAC) Protocol Specification (Release 1999)," 3GPP TS 25.321 V3.17.0, (Jun. 2004).
3GPP, "$3^{rd}$ Generation Partnership Project; Technical Specification Group Radio Access Network; Medium Access Control (MAC) Protocol Specification (Release 4)," 3GPP TS 25 321 V4.10.0, (Jun. 2004).
3GPP, "$3^{rd}$ Generation Partnership Project; Technical Specification Group Radio Access Network; Medium Access Control (MAC) Protocol Specification (Release 5)." 3GPP TS 25.321 \15.10.0, (Dec. 2004).
3GPP, "$3^{rd}$ Generation Partnership Project; Technical Specification Group Radio Access Network; Medium Access Control (MAC) Protocol Specification (Release 6)," 3GPP TS 25.321 V64.0. (Mar. 2005).
3GPP, $3^{rd}$ Generation Partnership Project; Technical Specification Group Radio Access Network; UTRAN Overall Description (Release 1999): 3GPP TS 25.40'1 V3, 10.0, (Jun. 2002).
3GPP, "$3^{rd}$ Generation Partnership Project Technical Specification Group Radio Access Network; UTRAN overall description (Release 4)," 3GPP TS 25.401 V4.6.0. (Dec. 2002).
3GPP. $3^{rd}$ Generation Partnership Project; Technical Specification Group Radio Access Network.; UTRAN overall description (Release 5), 3GPP TS 25.401 V5.8.0, (Jun. 2004).
3GPP, $3^{rd}$ Generation Partnership Project; Technical Specification Group Radio Access Network; UTRAN overall description (Release 5),. 3GPP TS 25401 V5.9.0, (Sep. 2004).
3GPP, $3^{rd}$ Generation Partnership Project; Technical Specification Group Radio Access Network; UTRAN overall description (Release 6), 3GPP TS 25.401 \16.3.0, (Jun. 2004).
3GPP, "$3^{rd}$ Generation Partnership Project; Technical Specification Group Radio Access Network; UTRAN overall description (Release 6)," 3GPP TS 25.401 V6 5.0, (Dec. 2004).
3GPP, "$3^{rd}$ Generation Partnership Project; Technical! Specification Group Radio Access Network; Requirements for support of radio resource management (FDD) (Release 1999)," 3GPP TS 25.133 V3.18.0 (Jun. 2004).
3GPP, "$3^{rd}$ Generation Partnership Project; Technical Specification Group Radio Access Network; Requirements for support of radio resource management (FDD) (Release 1999)," 3GPP TS 25.133 V3.20.0 (Mar. 20D5).
3GPP, "$3^{rd}$ Generation Partnership Project; Technical Specification Group Radio Access Network; Requirements for support of radio resource management (FDD) (Release 4)," 3GPP TS 25.133 V4.12.0 (Mar. 2004).
3GPP, "$3^{rd}$ Generation Partnership Project; Technical Specification Group Radio Access Network; Requirements for support of radio resource management (FDD) (Release 4)," 3GPP TS 25.133 V4.14.0 (Mar. 2005).

(56) References Cited

OTHER PUBLICATIONS

3GPP, "3rd Generation Partnership Project; Technical Specification Group Radio Access Network; Requirements for support of radio resoL1rce management (FDD) (Release 5)." 3GPP TS 25.133 V5.11.0 (Jun. 2004).

3GPP, "3rd Generation Partnership Project; Technical Specification Group Radio Access Network; Requirements for support of radio resource management (FDD) (Release 5)," 3GPP TS 25.133 V5.14.0 (Mar. 2005).

3GPP, "3rd Generation Partnership Project; Technical Specification Group Radio Access Network; Requirements for support of radio resource management (FOO) (Release SL" 3GPP TS 25.133 V6.6.0 (Jun. 2004).

3GPP, "3rd Generation Partnership Project; Technical Specification Group Radio Access Network; Requirements for support of radio resource management (FDD) (Release 6)," 3GPP TS 25.133 V6.9 .0 (Mar. 2005).

3GPP2 C S0002-C, "Physical Layer Standard for cdrna2000 Spread Spectrum Systems", 3rd Generation Partnership Project 2 '3GPP2', Version 2.0, Revision C, Jul. 23, 2004.

3GPP2 C.S0003-C. "Medium Access Control (MAC) Standard for cdma2000 Spread Spectrum Systems", 3rd Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3 Generation Partnership Project 2 3GPP2, Version 2 0, Revision C, Jul. 23, 2004.

3GPP2 C.50005-C. "Upper layer (Layer 3) Signaling Standard for cdma2000 Spread Spectrum Systems", 3 Generation Partnership Project 2 "3GPP2", Version 2.0, Revision C, Jul. 23, 2004.

Interdigital, "Text Proposal on Enhanced Uplink MAC Architecture for TS 25.309," 3GPP TSG RAN WG2 R6 AdHoc, R2-041276 (Jun. 21-24, 2004).

Final Office Action in U.S. Appl. No. 13/021,844 dated Feb. 21, 2013, whole document.

Final Office Action in U.S. Appl. No. 13/021,844 dated Mar. 22, 2013, whole document.

Notice of Allowance in U.S. Appl. No. 13/021,844 dated Aug. 21, 2013, whole document.

Office Action for U.S. Appl. No. 13/021,884 dated Dec. 7, 2012, whole document.

Dimou et al., "MAC Scheduling for Uplink Transmission in UMTS WCDMA," Ecole Nationale Superieure des Telecommunications, IEEE, 2001, pp. 2625-2629.

First Office Action for Chinese Application No. 201110371173.0 dated Nov. 25, 2013, whole document.

Office Action for EP Patent Application No. 10179333.9 dated Jan. 3, 2014, 3 Pages.

Office Action and Search Report for Taiwan Patent Application No. 100126090 dated Feb. 13, 2014, 12 pages.

Non-Final Office Action for U.S. Appl. No. 14/032,114, dated Apr. 30, 2014, 13 pages.

3rd Generation Partnership Project; Technical Specification Group Radio Access Network; Feasibility Study for Enhanced Uplink for UTRA FDD; (Release 6), 3GPP Draft; R1-031164_TR25.896_1.0.2, France, vol. RAN WG1, no. Lisbon, Portugal; Oct. 31, 2003, Oct. 31.

Ericsson, E-DCH multiplexing and transport channel structure, TSG-RAN Working Group 2 meeting #42, R2-040917, Montreal, Canada, May 10-14, 2004, 4 pages.

Communication Pursuant to Article 94(3) EPC dated Nov. 3, 2014, in European Patent Application No. 10 179 333.9-1857, 4 pages.

Communication pursuant to Article 94(3) EPC dated Sep. 1, 2015, in European Patent Application No. 10179333.9, 4 pages.

Ericsson: "E-DCH multiplexing proposal", 3GPP Draft; R2-041313, 3rd Generation Partnership Project (3GPP), Mobile Competence Centre, 650, Route Des Lucioles, F06921 Sophia-Antipolis Cedex, France, vol. RAN WG2, no. Cannes, France, Jun. 16, 2004.

Examiner's Report dated Jul. 17, 2014, in Canadian Patent Application No. 2,855,844, 2 pages.

Examiner's Report dated Jun. 3, 2015, in Canadian Patent Application No. 2,855,844, 3 pages.

Extended European Search Report dated Oct. 19, 2015, in European Patent Application No. 15180482.0, 8 pages.

Final Office Action dated Sep. 21, 2015, in U.S. Appl. No. 14/542,504, 9 pages.

Hearing Notice dated Nov. 5, 2014, in Indian Patent Application No. 160/DELNP/2007, 1 page.

Nokia et al: "HSDPA Mux Option parameters," 3GPP Draft; R3-020481 (HSDPA IUB MUX Parameters), 3GPP, Mobile Competence Ctr, 650, Rte Des Lucioles, F-06921 Sophia-Antipolis Cedex, FR, vol. RAN WG3, no. Orlando, US, Feb. 15, 2002, XP050152301 retrieved Feb. 15, 2002.

Norwegian Office Action and Search Report dated Feb. 24, 2016, Norwegian Patent Application No. 20151760, 5 pages.

Notice of Allowance dated Aug. 19, 2014, in U.S. Appl. No. 14/032,114.

Notice to Grant dated Mar. 10, 2016, Norwegian Patent Application No. 20070935, 2 pages.

Office Action dated Aug. 2014 (+ English translation), in Taiwan Patent Application No. 101129436, 12 pages.

Office Action dated May 28, 2015, in U.S. Appl. No. 14/542,504, 10 pages.

Official Action dated Jun. 23, 2015 (+ English translation), in Norwegian Patent Application No. 20070935, 3 pages.

Second Office Action dated Aug. 11, 2014 (+ English translation), in Chinese Patent Application No. 201110371173.0, 12 pages.

Second Office Action dated Jul. 22, 2014 (+ English translation), in Chinese Patent Application No. 201110371196.1, 17 pages.

Technical Specification Group Radio Access Network: "Feasibility Study for Enhanced Upling for UTRA FDD", 3GPP TR 25.896, V6.0.0, Release 6. Mar. 2004, side 1-169.

Third Office Action dated Feb. 2, 2015 (+ English translation), in Chinese Patent Application No. 201110371196.1, 17 pages.

Third Office Action dated Mar. 3, 2015 (+ English translation), in Chinese Patent Application No. 201110371173.0, 11 pages.

Notice of Allowance in U.S. Appl. No. 14/542,504 dated Feb. 12, 2016, 7 pages.

* cited by examiner

METHOD AND APPARATUS FOR ENHANCED UPLINK MULTIPLEXING

CROSS REFERENCE TO RELATED APPLICATIONS

This application is a continuation of U.S. patent application Ser. No. 14/542,504 filed Nov. 14, 2014, which is a continuation of U.S. patent application Ser. No. 14/032,114 filed Sep. 19, 2013, now issued as U.S. Pat. No. 8,923,173, which is a continuation of U.S. patent application Ser. No. 13/021,884 filed Feb. 7, 2011, now issued as U.S. Pat. No. 8,619,645, which is a continuation of U.S. patent application Ser. No. 11/113,763 filed on Apr. 25, 2005, now issued as U.S. Pat. No. 7,885,245, which claims the benefit of U.S. Provisional Application No. 60/588,960 filed Jul. 19, 2004, all of which are incorporated by reference as if fully set forth.

FIELD OF INVENTION

The present invention is related to a wireless communication system. More particularly, the present invention is a method and apparatus for enhanced uplink multiplexing.

BACKGROUND

In third generation (3G) wireless communication systems, a wireless transmit/receive unit (WTRU) has the ability to support multiple applications with different quality of services (QoS) requirements running simultaneously. Applications associated with individual data flows from a radio link control layer (RLC) are known as logical channels. These logical channels are mapped to transport channels (TrCH) within the medium access control (MAC) layer. Each TrCH is associated with a specific QoS. Logical channels with similar QoS requirements are mapped to common TrCHs.

Several TrCHs can be multiplexed into a coded composite transport channel (CCTrCH). Each TrCH has a specified coding rate and rate matching attributes within the CCTrCH to allow for different, levels of error protection. Combinations of TrCHs that are allowed in a CCTrCH transmit time interval (TTI) are defined by a transport format combination set (TFCS). The TFCS defines the allowed multiplexing combinations of TrCHs within each CCTrCH TTI.

Each TTI, the MAC selects a transport format combination (TFC) from the TFCS or a configured TFC subset. TFCs are selected based on the transmission priority of the logical channels that are mapped to each TrCH. TFC selection rules are based on maximizing transmission of the highest priority data.

The TFCS is configured to allow certain TrCH data combinations and not allow others. This mechanism is used to ensure maximum and minimum data rates of each TrCH within the CCTrCH.

Each TTL, TFCs within the TFCS are checked to determine if the TFCs can be supported by the available transmission power of the WTRU. A TFC which can not be supported is considered to be in an excess power state and can be transmitted for a short period. If the transmission power requirement is not satisfied within this period the TFC is blocked from transmission. Certain TFCs in a "minimum set" are excluded form being blocked. These transport channel configurations for the TFCS, TFC selection rules and the minimum set are used to maintain QoS of individual data flows.

Enhanced uplink (EU) has been developed to reduce transmission latency and increase radio resource efficiency in the uplink. A WTRU is provided with only one EU TrCH. Since there is only one EU TrCH per WTRU, just a list of transport formats (TFs) for the EU TrCH exists that does not distinguish requirements for different logical channel priorities and QoS. The configured CCTrCH TFCS and TFC selection rules to properly coordinate transmission multiplexing within TTIs only work where multiple TrCHs are provided and logical channels of common QoS requirements are mapped to specific TrCHs. Since there is only one BU TrCH, these multiplexing rules and the QoS provided ten individual data flows are run available for EU.

In order to properly maintain QoS requirements of individual data flows, it is necessary to define new WTRU multiplexing rules for logical channels or MAC-d flows mapped onto enhanced uplink medium access control (MAC-e) protocol data units (PDUs).

SUMMARY

The present invention is a method and apparatus for enhanced uplink multiplexing. A set of combinations of MAC-d flows, (and/or logical channels), that are allowed to be multiplexed within a MAC-e PDU is defined for each WTRU. The WTRU MAC-e entity selects a combination among a set of allowed combinations for multiplexing MAC-d flows for each MAC-e PDU. Certain logical channel or corresponding MAC-d flow combinations may be defined that can not be blocked from transmission even when the WTRU is in a transmit power restricted state. The amount of data from each logical channel or corresponding MAC-d flow that can be multiplexed within a MAC-e PDU may he defined to ensure guaranteed data rates. When the WTRU is in a restricted power condition that reduces the EU transmission pay load below what is allowed by the EC channel allocation received from Node-B, an indication of the restricted power condition nay be passed to Node-B with the EU transmission.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

Figure 1:
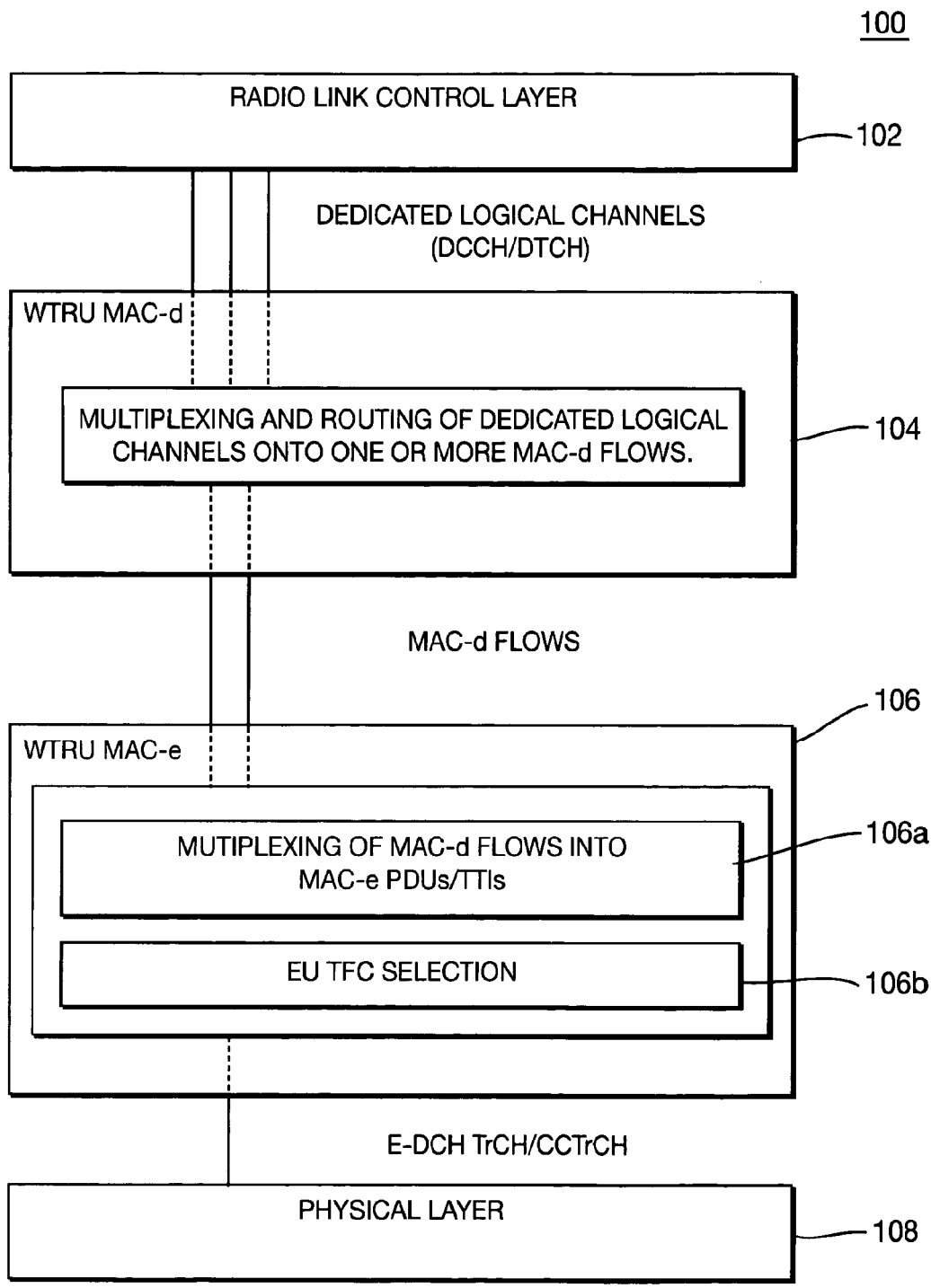
FIG. 1 is a block diagram of a WTRU for EU multiplexing in accordance with the present invention.

FIG. 1 is a block diagram of a WTRU 100 for EU multiplexing in accordance with the present invention. The WTRU comprises an RLC layer 102, a MAC-d entity 104, a MAC-e entity 106 and a PHY entity 108. The RLC layer 102, the MAC-d entity 104 and the PHY entity 108 perform similar functions of a WTRU in a current wireless communication system. It should be noted that the configuration shown in FIG. 1 is provided as an example, and the functions performed by the MAC-d entity and the MAC-e entity may be incorporated in one entity, and the functions of the entities in FIG. 1 may be implemented in more or less functional entities.

The RLC layer 102 comprises one or more RLC entities, each associated with certain logical channels, such as a dedicated control channel (DCCH) or a dedicated traffic channel (DTCH). Each MAC-d flow has its associated QoS attributes. The MAC-e entity 106 comprises a multiplexing function 106a and an EU TFC selection function 106b. The MAC-e entity multiplexes the MAC-d flows onto MAC-e PDUs while selecting a proper TF for the enhanced uplink dedicated channel (E-DCH). The PHY entity 108 processes MAC-e PDUs for wireless transmission.

The WTRU 100 is configured, to support EU transmission through a single EU TrCh. In accordance with the present invention, a set of allowed combinations of MAC-d flows, (and/or logical channels), that are allowed to be multiplexed within a MAC-e PDU is defined for each WTRU 100. MAC-e PDU multiplexing rules are defined which specify what data may be chosen from MAC-d flows, (and/or logical channels), and multiplexed onto a MAC-e PDU for maintaining QoS requirements. The rules may be pre-specified by the standard, or may be signaled to the WTRU 100 by a radio network controller (RNC) through radio resource control (RRC) procedures. An RRC signaled set of combinations provides the ability for the RNC to control logical channels or corresponding MAC-d flows to achieve their specific QoS requirements.

Certain MAC-d flow, (and/or logical channels), combinations that can not be blocked from transmission even when the WTRU is in a transmit power restricted state may also be defined to avoid blocking of any one MAC-d flow, (and/or logical channels). Transmission of these combinations may also be allowed without requiring EU channel allocations from Node-B.

In accordance with one embodiment, the number of PDUs per transmit time interval (TTI) from each MAC-d flow, (and/or logical channels), that can be multiplexed within a MAC-e PDU may be configured. The number of PDUs per TTI represents a data rate for each channel. For example, all allowed combinations may include one or more PDUs from a particular logical channel, which would guarantee that this particular logical channel is always served.

In accordance with another embodiment, the set of combinations can be defined with specific data rate from each MAC-d flow, (and/or logical channels), that can be multiplexed onto the MAC-e PDUs. The set of combinations may also be defined with specified date rate that can be combined or not, with specified data rates from other MAC-d flows, (and/or logical channels). The data rates from each MAC-d flow, (and/or logical channels), may be explicitly matched with the data rate of other MAC-d flows, (and/or logical channels). In certain combinations, the other channel(s) may transmit no data. The combination may also just identify possible rates for each MAC-d flow, (and/or logical channels), and allow the WTRU to choose any known rate from other channels that does not exceed the allocated physical channel or transmission power limits.

Within the set of allowed combinations, absolute or relative priority multiplexing rules may be defined to maintain proper prioritization between MAC-d flows, (and/or logical channels). In accordance with an absolute priority scheme, a logical channel or MAC-d flow of higher priority is always served before a logical channel or MAC-d flow of lower priority is served. The chosen multiplexing combination is the one that supports the most highest priority data within the set of TFs defined tor the EU TrCH.

Alternatively, logical channel or MAC-d flow combinations configured by RRC signaling procedures may take precedence over the absolute priority. The RRC signaling procedures may configure allowed combinations of logical channels or MAC-d flows within a MAC-e PDU. The core network may also specify die data size or number of MAC-d PDUs that are allowed to he multiplexed from each logical channel or MAC-d flow into each MAC-e PDU.

In accordance with a relative priority scheme, a weighting mechanism is specified in order to properly serve low priority channels. A weight is defined for each MAC-d flow, (and/or logical channel). Available bandwidth on the E-DCH is distributed to each logical channel or MAC-d. How according to the defined weight. This approach allows data rates to be distributed across logical channels or corresponding MAC-d flows and avoids bandwidth starvation of lower priority channels.

The set of allowed combinations may be explicitly signaled by RRC procedures. The RRC configuration allows the RNC to control WTRU multiplexing choices, which can be unique to requirements of the radio access bearer (RAB). Specific allowed combinations of logical channels or MAC-d flows are configured for multiplexing within each MAC-e PDU.

The WTRU continuously monitors the state of the allowed combinations of MAC-d flows, (and/or logical channels), each EU TTI, and selects a proper combination for transmission in accordance with the monitored state. If a transmit power requirement for a particular combination exceeds a remaining transmit power allowed for the WTRU E-DCH transmission, the combination is in an excess power state and the combination is blocked from B-TFC selection. The time to detect and block transmission of the MAC-d flow, (and/or logical channel), combinations may take several E-DCH TTIs. A similar mechanism is used to restore combinations to the set of allowed combinations when transmit power is sufficient.

Certain MAC-d flow, (and/or logical channel), combinations that can not be blocked from transmission even when the WTRU is in a transmit power restricted state may also be defined to avoid blocking of any one MAC-d flow, (and/or logical channel). Transmission of these combinations may also be allowed without requiring EU channel allocations from Node-B. Since there is only one EU TrCH, a set of TFCs corresponding to multiple TrCHs is not defined, but just a list of TFs is defined for the single EU TrCH. Therefore it is necessary to define MAC-d flow, (and/or logical channel), combinations in a minimum set which is excluded from being blocked. For example, the E-DCH minimum set may be defined such that it is always possible to transmit at least one MAC-d PDU from any MAC-d flow or logical channel even when the remaining power available for the E-DCH is restricted.

The rules for multiplexing MAC-d flows, (and/or logical channels), onto MAC-e PDUs per TTI may include a combination for each MAC-d flow, (and/or logical channel), that includes the smallest possible payload for one logical channel or MAC-d flow and no data for all other logical channels or MAC-d flows mapped to the EU TrCH. The set of these combinations may be defined as the minimum set. This may be a signaling radio bearer for guaranteeing a signaling to the Node-B in a power restricted state.

Under current 3GPP standards, a TFC is configured for each TrCH that provides the smallest possible transmission on one TrCH and no data on other TrCHs within the CCTrCH. These TFCs are always allowed for transmission to avoid the possibility of blocking individual channels. In the case of EU with only one TrCH supporting multiple logical channels or MAC-d flows, a single reserved TFC is not enough. For EU TrCH, several EU TFs or TFCs are required to support the minimum set on multiplexing combinations. EU TF or TFC includes configurations that allow for transmission of the smallest possible pay load for one logical channel or MAC-d flow.

When the WTRU is in a restricted power condition that reduces the EU transmission payload below what is allowed by the EU channel allocation received from a Node-B, an indication of the restricted power condition is passed to the Node-B with the EU transmission. The indication may be explicitly signaled by a signaling message, (such as a new information element). The WTRU may inform the level of available transmit power of the WTRU.

The Node-B may implicitly determine that the WTRU is in a power restricted state. The Node-B may detect the WTRU power restricted condition by comparing the channel allocation signaled to the WTRU and the corresponding transmission received from the WTRU. If the channel allocation exceeds what is transmitted and the WTRU either continues to transmit at the reduced rate or indicates it has more data to send, the Node-B implicitly detects the WTRU power restricted condition and takes appropriate actions.

Figure 2:
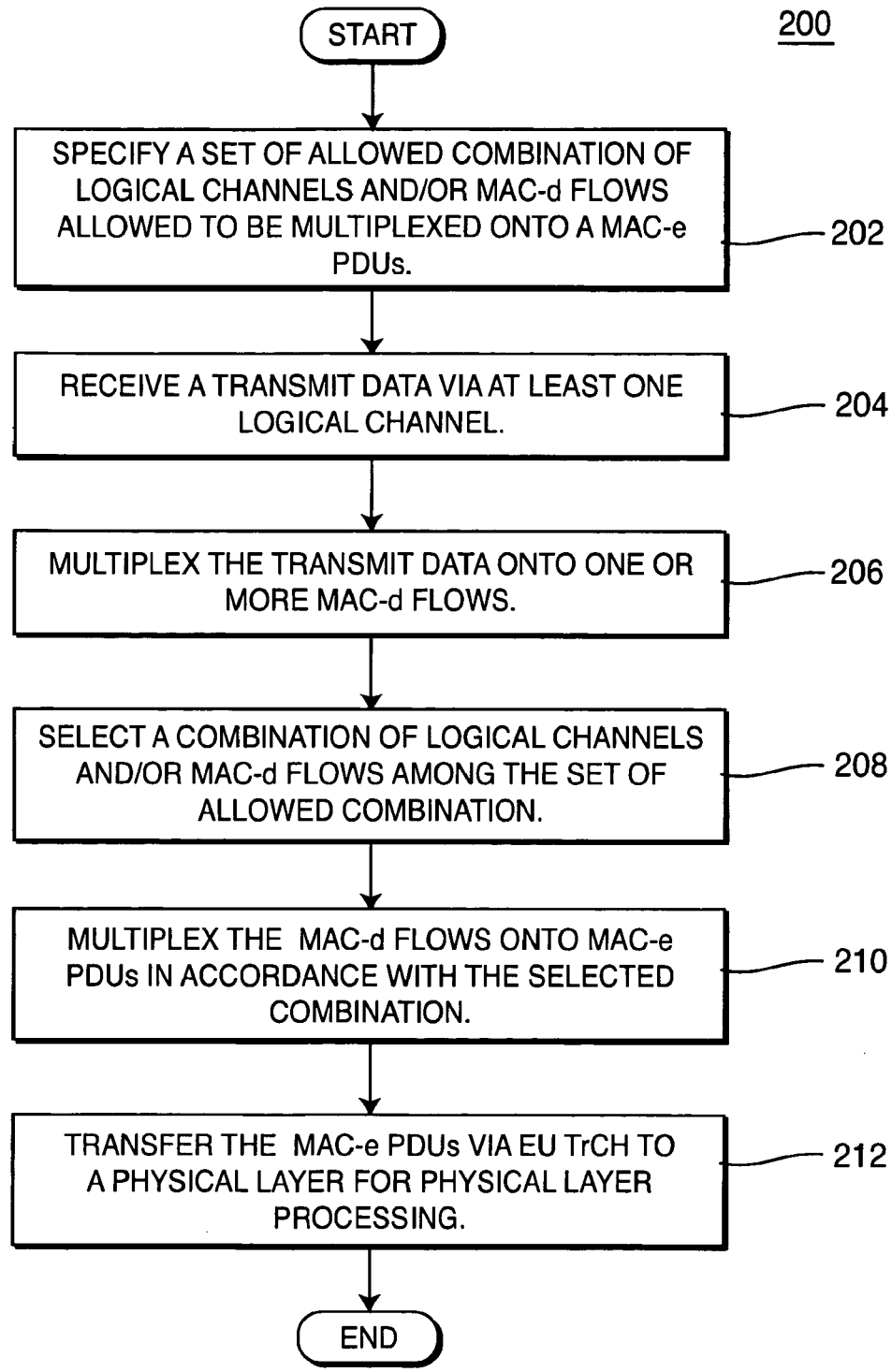
FIG. 2 is a flow diagram of a process for EU multiplexing in accordance with the present invention.

FIG. 2 is a flow diagram of a process 200 for EU multiplexing in accordance with the present invention. A WTRU is configured to support EU transmission through a single EU TrCH. A set of allowed combinations of MAC-d flows, (and/or logical channels), which is allowed to be multiplexed onto one MAC-e PDU is defined for each WTRU (step 202). Transmit data is processed at an RLC layer by at least one RLC entity and forwarded to a MAC-d entity via at least one logical channel (step 204). The transmit data is mapped onto one or more MAC-d flows at an MAC-d entity (step 206). Each MAC-d flow is associated with unique QoS attributes. A combination of MAC-d flows, (and/or logical channels), among the set of allowed combination is selected (step 208). Data from the MAC-d flows are multiplexed onto MAC-e PDUs in accordance with the selected combination (step 210). The MAC-e PDUs are forwarded via an EU TrCH to a physical layer for physical layer processing (step 212).

Figure 3:
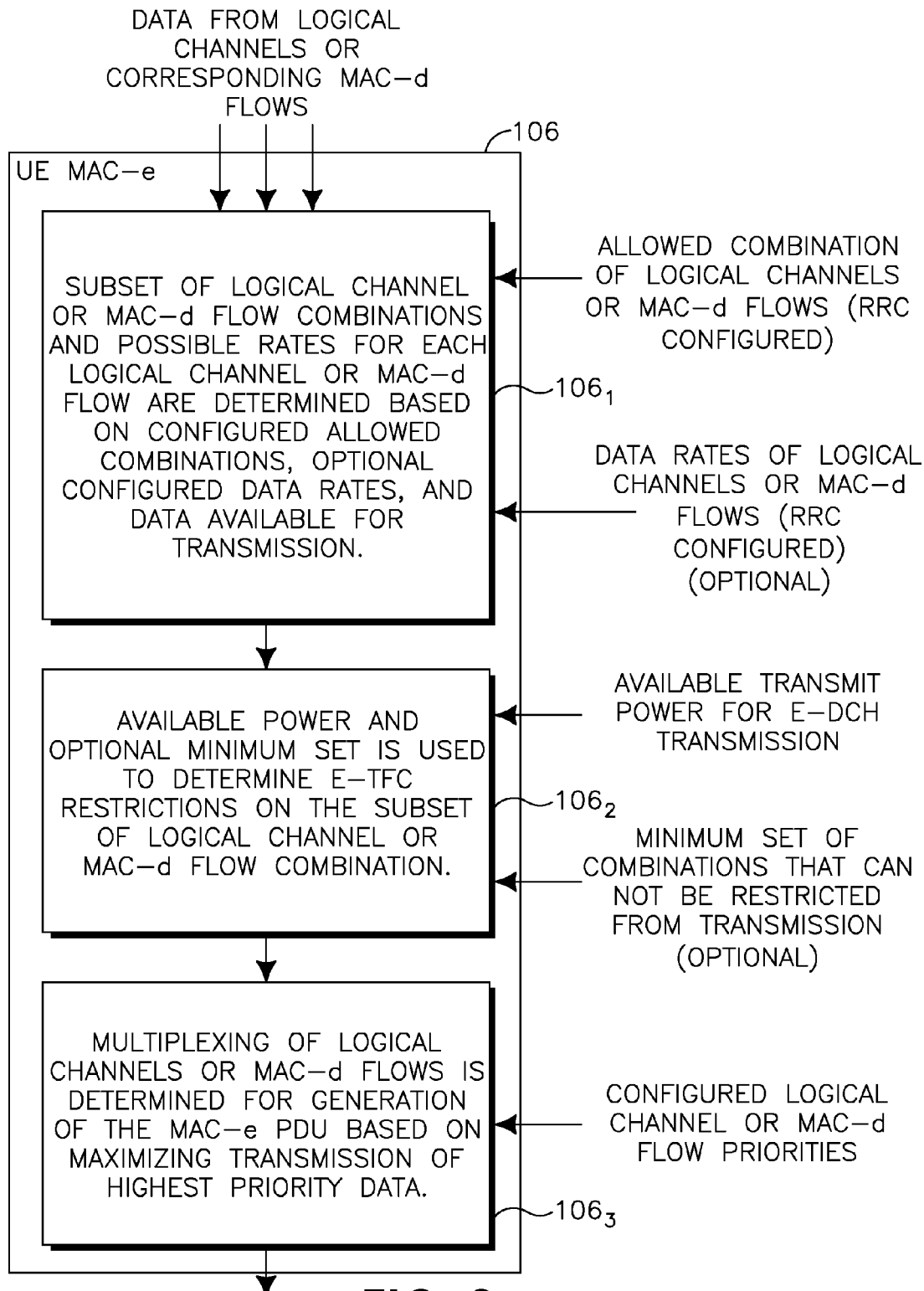
FIG. 3 is a block diagram of an example of WTRU MAC-e entity including functional blocks along with controlling signals in accordance with the present invention.

FIG. 3 is a block diagram of an example of WTRU MAC-e entity 106 including functional blocks along with controlling signals in accordance with the present invention. FIG. 3 shows three functional blocks. However, the configuration shown in FIG. 3 is provided as an example, and it should be noted that any other configuration may be implemented without departing from the teachings of the present invention. The functional blocks may be combined or separated more or less functional blocks, the order of the functional blocks may be changed in different order, and the functions may be performed simultaneously or in sequence.

Data from logical channels or corresponding MAC-d flows enter the first functional block $106_1$ of the MAC-e entity 100. The first functional block $106_1$ determines a subset of MAC-d flow, (and/or logical channels), combinations among the allowed combination of MAC-d flows, (and/or logical channel). Optionally, the first functional block $106_1$ may determine possible rates for each MAC-d flow, (and/or logical channel), in accordance with the RRC configuration.

The second functional block $106_2$ determines available power and E-TFCs for the subset of MAC-d flow, (and/or logical channel), combinations. The available power for E-DCH is also a configurable parameter. Optionally, the second functional block $106_2$ may determine the E-TFC based on a minimum set of combinations which cannot be blocked from transmission.

The third functional block $106_3$ generates MAC-e PDUs multiplexing MAC-d flows in accordance with a predetermined criteria, such as configured logical channel or MAC-d flow priorities maximizing transmission of the highest priority data.

Although the features and elements of the present invention are described in the preferred embodiments in particular combinations, each feature or element can be used alone without the other features and elements of the preferred embodiments or in various combinations with or without other features and elements of the present invention.

The invention claimed is:

1. A method for comprising: receiving information on a user equipment (UE) indicating combinations of dedicated channel medium access control (MAC-d) flows that are allowed to be multiplexed within an enhanced uplink (EU) medium access control (MAC-e) protocol data unit (PDU), wherein the information is received from a radio network through radio resource control (RRC) signaling; establishing a blocking criterion for determining whether a transport format combination (TFC) is in a blocked state based, at least in part, on a power remaining for EU transmission on the UE; and multiplexing a plurality of MAC-d flows within the MAC-e PDU in accordance with an allowed combination of MAC-d flows as indicated by the received information, wherein data of each of the plurality of MAC-d flows is processed in accordance with a TFC meeting the established blocking criterion.

2. The method of claim 1, further comprising: modifying the blocking criterion to a support a blocked TFC based, at least in part, on an updated power condition that provides at least a sufficient transmit power for the blocked TFC.

3. The method of claim 1, wherein the blocking criterion to not block a TFC configured to provide a smallest possible transmission on one transport channel (TrCH) and no data on other TrCHs within a coded composite TrCH (CCTrCH).

4. The method of claim 1, wherein the radio network includes a Node-B.

5. The method of claim 4, further comprising: transmitting the MAC-e PDU without requiring a resource allocation from the Node-B.

6. The method of claim 1, wherein each of the plurality of MAC-d flows is associated with a priority, and wherein each of the plurality of MAC-d flows is served based on priority.

7. The method of claim 6, further comprising: permitting a MAC-d flow to be multiplexed based, at least in part, on its associated priority.

8. The method of claim 6, wherein data from a logical channel mapped to a MAC-d flow associated with a highest priority is multiplexed first up to the specified data rate associated with the highest priority MAC-d flow.

9. The method of claim 6, wherein data from a logical channel mapped to a MAC-d flow associated with a higher priority is multiplexed up to its specified data rate before data from a logical channel mapped to a MAC-d flow associated with a lower priority is multiplexed.

10. The method of claim 1, wherein the radio network includes a radio network controller (RNC) and the allowed combination of MAC-d flows are allowed based, at least in part, on a Quality of Service (QoS) for the RNC.

11. A user equipment (UE) comprising: receiving circuitry to receive information indicating combinations of dedicated channel medium access control (MAC-d) flows that are allowed to be multiplexed within an enhanced uplink (EU) medium access control (MAC-e) protocol data unit (PDU), wherein the information is received from a radio network through radio resource control (RRC) signaling; transport format combination (TFC) selection circuitry to establish a blocking criterion for determining whether a TFC is in a blocked state based, at least in part, on a power remaining for EU transmission on the UE; and multiplexing circuitry to multiplex a plurality of MAC-d flows within the MAC-e PDU in accordance with an allowed combination of MAC-d flows as indicated by the received information, wherein data of each of the plurality of MAC-d flows is processed in accordance with a TFC meeting the established blocking criterion.

12. The UE of claim 11, the TFC selection circuitry to further modify the blocking criterion to a support a blocked TFC based, at least in part, on an updated power condition that provides at least a sufficient transmit power for the blocked TFC.

13. The UE of claim 11, wherein the blocking criterion of the TFC selection circuitry to not block a TFC configured to provide a smallest possible transmission on one transport channel (TrCH) and no data on other TrCHs within a coded composite TrCH (CCTrCH).

14. The UE of claim 11, wherein the radio network includes a Node-B.

15. The UE of claim 14, further comprising: transmission circuitry to transmit the MAC-e PDU without requiring a resource allocation from the Node-B.

16. The UE of claim 11, wherein each of the plurality of MAC-d flows is associated with a priority, and wherein each of the plurality of MAC-d flows is served based on priority.

17. The UE of claim 16, wherein a MAC-d flow is permitted to be multiplexed based, at least in part, on its associated priority.

18. The UE of claim 16, wherein data from a logical channel mapped to a MAC-d flow associated with a highest priority is multiplexed first up to the specified data rate associated with the highest priority MAC-d flow.

19. The UE of claim 16, wherein data from a logical channel mapped to a MAC-d flow associated with a higher priority is multiplexed up to its specified data rate before data from a logical channel mapped to a MAC-d flow associated with a lower priority is multiplexed.

20. The UE of claim 11, wherein the radio network includes a radio network controller (RNC), and the allowed combination of MAC-d flows are allowed based, at least in part, on a Quality of Service (QoS) for the RNC.

* * * * *